US008368757B2

(12) United States Patent
Gräser et al.

(10) Patent No.: US 8,368,757 B2

(45) Date of Patent: Feb. 5, 2013

(54) PROCESS FOR MONITORING TERRITORIES IN ORDER TO RECOGNISE FOREST AND SURFACE FIRES

(75) Inventors: Günter Gräser, Schwanebeck (DE); Andreas Jock, Mahlow (DE); Uwe Krane, Berlin (DE); Hartmut Neuss, Zeuthen (DE); Holger Vogel, Berlin (DE); Volker Mertens, Berlin (DE); Jorg Knollenberg, Berlin (DE); Thomas Behnke, Zeesen (DE); Ekkehard Kürt, Zeuthen (DE)

(73) Assignee: IQ Wireless GmbH, Berlin (DE)

( * ) Notice: Subject to any disclaimer, the term of this patent is extended or adjusted under 35 U.S.C. 154(b) by 990 days.

(21) Appl. No.: 11/791,169

(22) PCT Filed: Oct. 20, 2005

(86) PCT No.: PCT/DE2005/001929

§ 371 (c)(1),
(2), (4) Date: Jan. 11, 2010

(87) PCT Pub. No.: WO2006/053514

PCT Pub. Date: May 26, 2006

(65) Prior Publication Data

US 2010/0194893 A1 Aug. 5, 2010

(30) Foreign Application Priority Data

Nov. 22, 2004 (DE) ........................ 10 2004 056 958

(51) Int. Cl.
*H04N 7/18* (2006.01)

(52) U.S. Cl. ....................................... 348/159; 348/143

(58) Field of Classification Search ........................ None
See application file for complete search history.

(56) References Cited

U.S. PATENT DOCUMENTS

| | | | | |
|---|---|---|---|---|
| 5,218,345 | A * | 6/1993 | Muller et al. | ................. 340/578 |
| 5,534,697 | A | 7/1996 | Creekmore et al. | |
| 5,557,260 | A | 9/1996 | Legaz et al. | |

(Continued)

FOREIGN PATENT DOCUMENTS

| | | | |
|---|---|---|---|
| DE | 91 07 452 | U1 | 2/1992 |
| EP | 0 611 242 | A | 8/1994 |

(Continued)

*Primary Examiner* — Thu Nguyen
*Assistant Examiner* — Nam Tran
(74) *Attorney, Agent, or Firm* — Birch, Stewart, Kolasch & Birch, LLP

(57) ABSTRACT

Disclosed are processes for the centralised monitoring of territories to recognize forest and surface fires. A swiveling and tiltable camera installed at a monitoring site supplies images of overlapping observation sectors. In each observation sector a sequence of images includes a plurality of images is taken, at an interval which corresponds to fire and smoke dynamics. An on-site image-processing software supplies event warnings with indication of the position of the event site in the analysed image. A total image and an image sequence with image sections of the event site are then transmitted to a central station and reproduced at the central station as a continuous sequence in quick-motion mode. Event warnings with relevant data are blended into electronic maps at the central station. Cross-bearing is made possible by blending event warnings from adjacent monitoring sites. False alarms are minimized by marking known false alarm sources as exclusion zones.

20 Claims, 1 Drawing Sheet

U.S. PATENT DOCUMENTS

| | | | | |
|---|---|---|---|---|
| 5,734,335 | A * | 3/1998 | Brogi et al. | 340/870.05 |
| 6,970,183 | B1 * | 11/2005 | Monroe | 348/143 |
| 7,155,029 | B2 * | 12/2006 | King et al. | 382/100 |
| 2004/0061777 | A1 * | 4/2004 | Sadok | 348/83 |
| 2004/0068583 | A1 * | 4/2004 | Monroe et al. | 709/246 |
| 2004/0175040 | A1 * | 9/2004 | Rizzotti et al. | 382/190 |

FOREIGN PATENT DOCUMENTS

| | | | |
|---|---|---|---|
| WO | WO-97/35433 | A | 9/1997 |
| WO | WO-2004/008407 | A | 1/2004 |

* cited by examiner

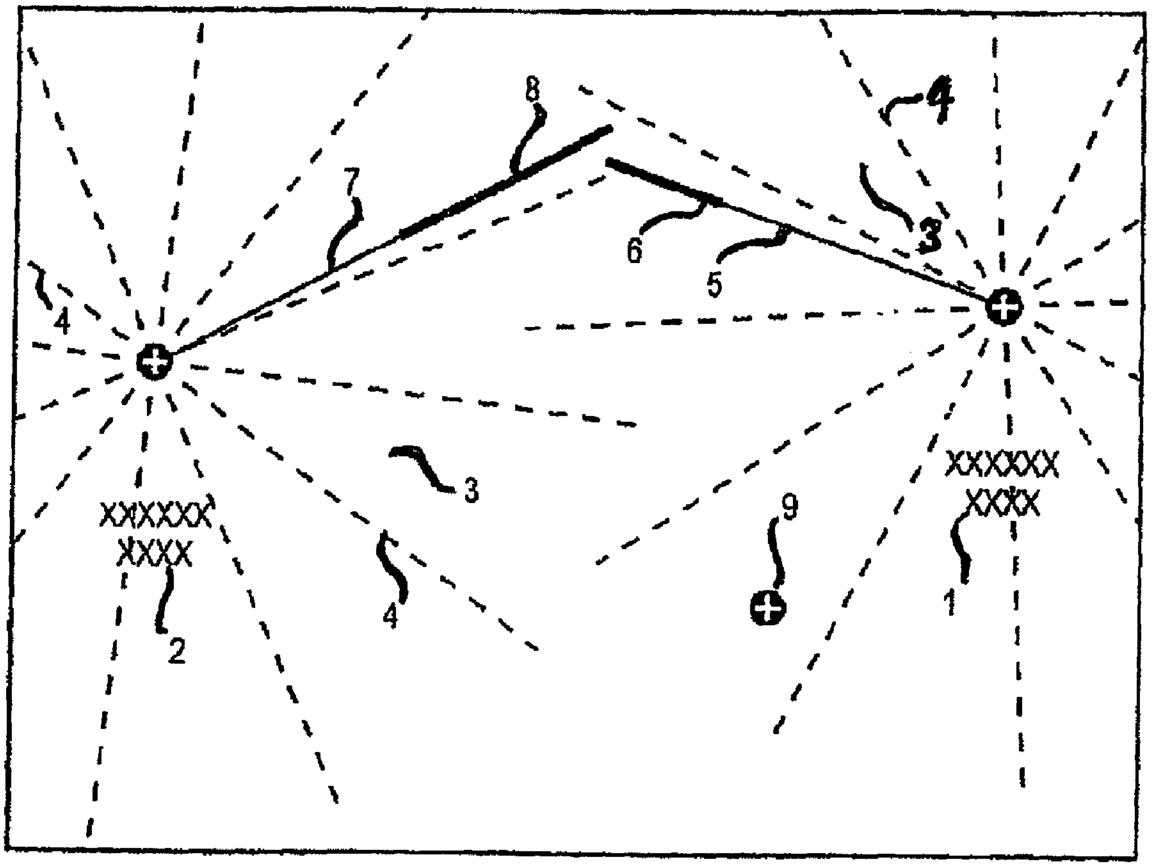
8
7
4
3
6
5
4
3
XXXXXX
XXXX
XXXXXX
XXXX
9
1
2
4
3
4

PROCESS FOR MONITORING TERRITORIES IN ORDER TO RECOGNISE FOREST AND SURFACE FIRES

CROSS-REFERENCE TO RELATED APPLICATION

The present application claims priority under 35 U.S.C. §119 to PCT/DE 2005/001929, filed Oct. 20, 2005, and DE 10 2004 0456 958, filed Nov. 22, 2004.

BACKGROUND OF THE INVENTION

1. Field of the Invention

The prompt detection of forest and surface fires is crucial for successfully fighting them. To this day, fire watches requiring the deployment of substantial numbers of personnel are set up in many territories at times when fires are likely to erupt, involving the visual observation of the territory from elevated vantage points or dedicated towers.

2. Description of Background Art

The detection of fires and/or smoke in outdoor areas by technical means has developed to some sophistication and a variety of options.

Earlier systems mostly evaluate the IR spectrum, mainly using sensor cells. For reasons of cost, IR cameras are used less frequently. A typical representative is the system described in [1] (U.S. Pat. No. 5,218,345), which uses a vertical array or line of IR detectors. This detector array is positioned in front of a reflector for horizontal swivelling together with it so as to scan a territory. The sensitivity of the sensors within the array is graded to prevent an over-emphasis of the foreground relative to the near-horizon areas.

[2] (DE 198 40 873) describes a process which uses different types of cameras and evaluates the visible spectrum. The parallel application of several different methods of analysis makes possible the detection of both fire and smoke. An essential feature is the comparison of reference images in memory with current images by way of generating differential images and by the application of analysis algorithms to the latter, with evaluation focused on texture properties, above all.

For detection, the system described in [3] (U.S. Pat. No. 5,289,275) evaluates relative colour intensities in the visible spectrum in addition to the TIR range (thermal infrared range), based on the assumption that, in particular, the Y/R (yellow to red) and B/R (blue to red) ratios contain features significant for fire detection.

The systems described in [4] (U.S. Pat. No. 4,775,853) and [5] (U.S. Pat. No. 5,153,722) evaluate the IR, UV and visible ranges of the spectrum in combination, assuming in particular that a significant ratio of the IR and UV intensities is indicative of fire.

These and various other publications not mentioned above are concerned exclusively with means and methods for the direct outdoor fire and/or smoke detection, i.e. under open-country conditions and over great distances. Procedures involving a complex monitoring of territories are not taken into consideration. Methods of this type must include at least one of the aforesaid processes for automatic fire and/or smoke detection and, in addition, must be designed to co-operate with further automatic or personnel-operated processes up to and including the issuing of instructions to firefighting crews.

SUMMARY AND OBJECTS OF THE INVENTION

The object underlying the present invention is to overcome the limitations of the existing methods and to implement a method for the complex monitoring of territories for forest and surface fire detection which embraces one of the aforesaid approaches. For outdoor fire and/or smoke detection, the invention embraces a method as described in DE 198 40 873. As a matter of principle, however, the inventive solution is not exclusively linked to that method and allows for the use of other detection methods also.

For the monitoring of territories for forest and/or surface fire detection, the invention provides for the setting up of at least one—and preferably a plurality of—observation sites of which the observation areas overlap. The observation sites require an elevated position for installing a camera, preferably a CCD matrix camera, in a swivel-and-tilt mount. If omnidirectional view through 360° is required, the camera must be installable at the highest point of the camera site. Such sites may be dedicated masts, existing forest fire watch towers or communication mast structures, etc. The observation site includes a control and evaluation unit running image processing software for fire and/or smoke detection in an image as well as control software, and is equipped with picture and event memory and an interface to communication equipment. Further, the control software includes modules for image manipulation and the generation of panoramic views.

Themselves set up for unmanned operation, the observation sites are linked to a manned central station, the latter including a computer unit comprising an operating, display and monitoring workplace, control software, event and image memory space, means for mixing and displaying images on at least one monitor, as well as interfaces to communication equipment.

A communication unit for communicating images, data and control information, and including an audio service channel to firefighting crews present at the observation site, serves to connect the latter with the central station. Such crews may use permanent or semi-permanent ISDN lines, Internet access or dedicated radio links.

Additionally, the central station has available radio means for communicating with and passing operating instructions on to mobile firefighting crews. The crews are equipped with positioning means such as GPS devices, with their positions automatically transmitted to the central station by said radio means and the intervals between position reports matched to the speed of travel typical of such crews.

The method of the present invention, comprises

Step i) at the central station, a manual request can be entered and communicated to the monitoring site, which causes its control software to extract from the images of the current image sequence the image portions corresponding to the marked event location, to compress them, and to communicate them as an image sequence to the central station; and Step j) when received at the central station, the images of the image sequence corresponding to step (i) are decompressed, stored, and displayed as an endless sequence in a fast-motion display mode, and said sequence is inserted into the overall image of Step (g) if an event message is generated, the control software marks the event location in one of the pertinent images on the basis of the data concerning the location and magnitude of the event, and proceeds to compress the image and to transmit it to the central station together with an alert message comprising the identity of the monitoring site, the observation sector, the direction of and the estimated distance to the event location;

or displayed by itself in a large-scale format.

This way, the connection between automatic detection and subjective evaluation can be realized in a particularly effective manner.

In the method of the present invention, the central station has available to it electronic maps and/or digitized and memorized aerial photographs of the territories monitored, referred to generally as "maps" hereinafter. A constituent part of the control software is software for zooming and scrolling co-ordinate-based electronic maps and for inserting co-ordinate-based data. The maps are displayed automatically in response to incoming messages or to messages having alert status, or in response to manual request in the case of messages not having alert status, with information identifying the observation site, the observation sector, the direction and the estimated distance to the event location being inserted in the map automatically in a graphic or alphanumeric data format and with the representation following the processes displaying the image and the map selectively according to the split-screen principle or separately on two different screens.

According to the present invention, if two or more messages arrive at the same or almost the same time from neighbouring observation sites, the information in all these messages is displayed in a map in order to enable a cross bearing to be derived.

According to the present invention, if simultaneous or near-simultaneous messages from adjacent observation sites are absent, it is possible to insert them in the map by manual request, with the operator him- or herself determining potentially pertinent observation sectors. This way, manual images may be called down from these observation stations later on and be included in a subjective evaluation.

According to the present invention, firefighting crews are equipped with position determining means such as GPS devices, with their positions and identifications transmitted automatically to the central station via the aforesaid radio link. The positions and identifications are automatically inserted in the map in a graphic or alphanumeric format. Regardless of event messages, this information is displayed automatically in response to manual map call-up requests also.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawing which is given by way of illustration only, and thus are not limitative of the present invention, and wherein:

FIG. 1 shows a possible implementation of data and representations inserted in a map in accordance with the present invention. For reasons of clarity, the underlaid map itself is not shown in the drawing.

FIG. 1 shows an observation site identified by a site identifier 1, with the event message from this site assumed to have been the first message and represented by a direction vector 5 with an estimated distance range 6. The event message from the observation site identified by the site identifier 2 is represented by direction vector 7 and an estimated distance range 8. Evidently and understandably, the distance estimate on the basis of a two-dimensional image is subject to substantial uncertainty; yet the utility of the information displayed can be enhanced considerably by deriving a cross bearing from the direction information.

FIG. 1 also shows for each observation site the observation sectors 3, their identification numbers as well as their boundaries 4. The representation ignores that the observation sectors 3 are in fact slightly broader to ensure some overlap. The width of the observation sectors 3 depends on the horizontal aperture angle of the camera lenses and may be varied by selecting lenses having different focal length. The selection is determined above all by the structure of the territory to be monitored.

FIG. 1 also shows the position and the identification of a firefighting crew 9.

Further essential aspects of the inventive solution are to ensure the rapid processing of data by the image processing software for smoke and/or fire detection and to minimize the number of false alerts.

The processing of data by the image processing software requires considerable computing power and time. In order to minimize this effort and time, data reduction is performed before the data is passed on to the image processing software.

The method of the present invention starts out from the fact that, in a two-dimensional image, perspective distortion causes the foreground to appear to be enlarged; for this reason, the image provides a very high resolution in this area although the task to be accomplished does not require it. In accordance with the present invention, no data reduction takes place in the horizontal direction; in the direction toward the foreground, data reduction is increased in steps as finely graded as possible, with the finest grade given by the pixel structure of the image.

In accordance with the method of the present invention, image portions which do not contribute to a solution of the underlying problem are not passed on to the image processing software. The vertical image boundary in the top image region crops unnecessary image portions of the sky, retaining a minimum sky area above the horizon as smoke is most clearly detected before a background sky. The vertical image boundary in the bottom image region crops unnecessary foreground areas, which it would be meaningless to input to the routine even if data reduction using the method of the present invention were applied.

Vertical image boundaries can be entered separately for each observation sector 3 of the observation site. This may be combined with a separate adjustment of the camera tilt angle for each observation site. This adjustment is particularly relevant to mountain areas where observation sectors 3 of an observation site may be directed down into a valley, or up against a mountain slope.

Vertical image boundaries and camera tilt angle are manually set at the central station based on the images transmitted from the observation site. Insertions are made directly into the images, are communicated by the central station's control software to the control software of the observation site, and are memorized at both locations. The control software makes possible the insertion of graphic information into the displayed images. The control software memorizes the types and positions of the graphic elements as data files associated with the respective image.

The method of the present invention includes minimizing the number of false alerts. So-called exclusion areas are defined manually at the central station on the basis of the images communicated from the observation site. Insertions are made directly into the images, are communicated by the central station's control software to the control software of the observation site, and are memorized at both locations. In this respect, reference is made to the description hereinabove of the vertical image bounding process. Exclusion areas may be defined as polygons of any shape, thus ensuring a good match to existing conditions. At the central station, it can be determined, and communicated to the observation site, whether an event message pertaining to an exclusion area is to be reported to the central station. Such messages, if transmitted, are not assigned an alert status.

The invention claimed is:

1. A method of monitoring territories and detecting forest and surface fires with a monitoring system including:

a first complex of means stationed at a minimum of one monitoring site, said complex comprising: a camera mounted at an elevated location with the ability to tilt and swivel, the horizontal swivel range being at least 360°, control and evaluation means connected to the camera and running image-processing software for detecting smoke and/or the fire in images from the camera, and having control software, memory for storing events and the images, and an interface to communication means;

a second complex of means installed at a manned central station and comprising a computer including an operating, display and monitoring workplace, control software, memory for the events and the images, means for mixing and outputting the images to at least one monitor, and at least two interfaces to the communication means;

the communication means including:

first bidirectional communication means for image files, data, and voice to interconnect said first and second complexes; and second bidirectional data and voice communication means to connect said second complex with deployed firefighting crews, the method comprising:

a) dividing an observation area of the monitoring site into observation sectors each corresponding to a horizontal aperture angle of a lens of the camera;

b) selecting a horizontal angular distance between adjacent observation sectors to create an overlap between them;

c) aiming the camera by positioning means at said observation sectors in automatic succession, or in any order under manual control from the central station;

d) after aiming the camera, providing a plurality of the images timed for adaptation to dynamics of the smoke and the fire;

e) sending the images to a control unit of the monitoring site for storage as an image sequence;

f) processing the images in the control unit of the monitoring site with the image-processing software for detecting the smoke and/or the fire, the image-processing software responding to a presence of the smoke and/or the fire by issuing an event message and data relating to a location and magnitude of the event;

g) if the event message is generated, using the control software of the monitoring site to mark the location of the event in a pertinent one of the images based on the data concerning the location and the magnitude of the event, and to compress the image and to transmit the image to the central station together with an alert message comprising an identity of the monitoring site, an identity of the observation sector, a direction of and an estimated distance to the location of the event;

h) visibly or audibly reproducing the alert message received at the central station, decompressing and storing the image, and displaying the image either automatically or in response to a manual request;

i) at the central station, entering a manual request and communicating the request to the monitoring site, causing the control software at the monitoring site to extract image portions corresponding to the marked location of the event from the images of a current image sequence, to compress the image portions, and to transmit the image portions as an image sequence to the central station;

j) when the image portions corresponding to the marked location of the event are received at the central station, the images portions are decompressed, stored, and displayed as a continuous sequence in a fast-motion display mode, and said sequence is inserted into an overall image, or is displayed in a large-scale format the method further comprising:

eliminating sources of false alerts including settlements, streets and roads, and surfaces of bodies of water where the smoke may occur by manually calling up and displaying at the central station images of the observation sectors, or a panoramic image with the marked observation sectors of the monitoring site, causing the control software to outline by a polygon of a suitable shape the portions of an individual image, or of the panoramic image, which may lead, or have previously led, to other false alerts;

causing the control software of the central station to determine parameters of the polygon and to communicate the parameters as exclusion areas to the control software of the monitoring site;

determining manually at the central station whether event messages pertaining to exclusion areas are to be reported to the central station, and causing the control software at the central station to communicate results of the determining step to the control software of the monitoring site;

in case the image processing software issues the event message, the control software of the monitoring site checking whether the message pertains to a least one of the exclusion areas; and in case the event message pertains to the exclusion area, the control software of the monitoring site proceeding if instructed to report the event messages to the central station, but without assigning an alert status to the event messages.

2. The method as in claim 1, in the control unit in the monitoring site, the method further comprising:

o) cropping the image vertically by removing from its top and/or bottom edges the horizontal image strips not relevant to detecting the forest fires and doing so before communicating the image to the image-processing software;

p) inputting the data-reduced images thus obtained to the image-processing software for detecting the smoke and/or the fire; and q) inserting into an original image the data on the location and the magnitude of the event returned by the image-processing software, taking manipulations of step (o) into account.

3. The method as in claim 2, the method further comprising:

predefining the step of cropping the image vertically for each one of the observation sectors.

4. The method as in claim 3, the method further comprising;

combining the step of cropping the image vertically with a different camera tilt for each one of the observation sectors.

5. The method as in claim 2, the method further comprising;

combining the step of cropping the image vertically with a different camera tilt for each one of the observation sectors.

6. The method as in claim 2, the method further comprising:

r) using the operating, display and monitoring workplace of the computer unit to manually call up the images from the observation sectors, or a panoramic image with the observation sectors marked;

s) entering measures for a vertical image crop and a tilt of the camera defined for each of the observation sectors by means of the control software into the images of the individual observation sectors or into the panoramic image;

t) using the control software for determining parameters of the entered measures and transmitting the entered measures to the control software of the monitoring site;

u) repeating the step (r) to check the measures of steps (s) and (t) for correctness and repeating the steps (s) and (t) to increase precision.

7. The method as in claim 1, at the central station, the method further comprising:

r) using the operating, display and monitoring workplace of the computer unit to manually call up the images from the observation sectors, or a panoramic image with the observation sectors marked;

s) entering measures for a vertical image crop and a tilt of the camera defined for each of the observation sectors by means of the control software into the images of the individual observation sectors or into the panoramic image;

t) using the control software for determining parameters of the entered measures and transmitting the entered measures to the control software of the monitoring site;

u) is repeated repeating the step (r) to check the measures of steps (s) and (t) for correctness and repeating the steps (s) and (t) to increase precision.

8. The method as in claim 1, wherein the central station has electronic maps and/or digitized and stored aerial photographs of the areas monitored, the method comprising:

displaying a pertinent one of the maps automatically or in response to manual request in response to the message received at the central station, and automatically inserting into the pertinent map the data comprising the identity of the monitoring station, the observation sector, the direction, and the estimated distance to the location of the event in a graphic and an alphanumeric data format.

9. The method as in claim 8, at the central station, the method further comprising:

when two or more of the alert messages are received at the same or nearly the same time from adjacent monitoring sites, displaying information contained in all said alert messages on the pertinent map so that a cross bearing can be taken.

10. The method as in claim 9, at the central station, the method further comprising:

v) expanding displayed information can be expanded to the adjacent monitoring sites by zooming and shifting displayed portions of the pertinent map;

w) displaying the adjacent monitoring sites and the observation sectors thereof in response to a manual request;

x) determining from the pertinent map the observation sectors of the adjacent monitoring sites which are relevant to the received messages;

y) manually calling up the current images of the observation sectors of the adjacent monitoring site at the operating, display, and monitoring workplace of the computer unit;

z) visually analyzing the images so obtained for features of the smoke and the fire that the image-processing software failed to identify as an event;

aa) marking the location of a visually detected or suspected event in the image by the control software;

bb) deriving the alert message comprising the identity of the monitoring site by control software; and cc) subjecting the alert message thus derived to further treatment.

11. The method as in claim 8, at the central station, the method further comprising:

v) expanding displayed information can be expanded to the adjacent monitoring sites by zooming and shifting displayed portions of the pertinent map;

w) displaying the adjacent monitoring sites and the observation sectors thereof in response to a manual request;

x) determining from the pertinent map the observation sectors of the adjacent monitoring sites which are relevant to the received messages;

y) manually calling up the current images of the observation sectors of the adjacent monitoring site at the operating, display, and monitoring workplace of the computer unit;

z) visually analyzing the images so obtained for features of the smoke and the fire that the image-processing software failed to identify as an event;

aa) marking the location of a visually detected or suspected event in the image by the control software;

bb) deriving the alert message comprising the identity of the monitoring site by control software; and cc) subjecting the alert message thus derived to further treatment.

12. The method as in claim 8, method further comprising:

dd) equipping the deployed firefighting crews with global position determining means;

ee) communicating current positions of the deployed firefighting crews by radio to the central station on an automatic and continuous basis;

ff) upon automatic or manual call-up of the pertinent map, automatically showing the positions of the deployed firefighting crews in a displayed area of the pertinent map in the graphic and the alphanumeric data format.

13. The method as in claim 1, the method further comprising:

dd) equipping the deployed firefighting crews with global position determining means;

ee) communicating current positions of the deployed firefighting crews by radio to the central station on an automatic and continuous basis;

ff) upon automatic or manual call-up of a pertinent map, automatically showing the positions of the deployed firefighting crews in a displayed area of the pertinent map in a graphic and an alphanumeric data format.

14. The method as in claim 13, the method further comprising:

selectively displaying the image and the pertinent map according to a split-screen principle, or separately on two different screens.

15. The method as in claim 1, the method further comprising:

r) using the operating, display and monitoring workplace of the computer unit to manually call up the images from the observation sectors, or a panoramic image with the observation sectors marked;

s) entering measures for a vertical image crop and a tilt of the camera defined for each of the observation sectors by means of the control software into the images of the individual observation sectors or into the panoramic image;

t) using the control software for determining parameters of the entered measures and transmitting the entered measures to the control software of the monitoring site;

u) repeating step (r) to check the measures of steps (s) and (t) for correctness and repeating the steps (s) and (t) to increase precision.

16. The method as in claim 1, wherein when the image is transmitted from the monitoring site to the central station, no data reduction takes place in a horizontal direction.

17. A method of monitoring territories and detecting forest and surface fires with a monitoring system including:

a first complex of means stationed at a minimum of one monitoring site, said complex comprising: a camera mounted at an elevated location with the ability to tilt and swivel, the horizontal swivel range being at least 360°, control and evaluation means connected to the camera and running image-processing software for detecting smoke and/or the fire in images from the camera, and having control software, memory for storing events and the images, and an interface to communication means;

a second complex of means installed at a manned central station and comprising a computer including an operating, display and monitoring workplace, control software, memory for the events and the images, means for mixing and outputting the images to at least one monitor, and at least two interfaces to the communication means;

the communication means including:

first bidirectional communication means for image files, data, and voice to interconnect said first and second complexes; and second bidirectional data and voice communication means to connect said second complex with deployed firefighting crews, the method comprising:

a) dividing an observation area of the monitoring site into observation sectors each corresponding to a horizontal aperture angle of a lens of the camera, b) selecting a horizontal angular distance between adjacent observation sectors to create an overlap between them;

c) aiming the camera by positioning means at said observation sectors in automatic succession, or in any order under manual control from the central station;

d) after aiming the camera, providing a plurality of the images timed for adaptation to dynamics of the smoke and the fire;

e) sending the images to a control unit of the monitoring site for storage as an image sequence;

f) processing the images in the control unit of the monitoring site with the image-processing software for detecting the smoke and/or the fire, the image-processing software responding to a presence of the smoke and/or the fire by issuing an event message and data relating to a location and magnitude of the event;

g) if the event message is generated, using the control software of the monitoring site to mark the location of the event in a pertinent one of the images based on the data concerning the location and the magnitude of the event, and to compress the image and to transmit the image to the central station together with an alert message comprising an identity of the monitoring site, an identity of the observation sector a direction of and an estimated distance to the location of the event;

h) visibly or audibly reproducing the alert message received at the central station, decompressing and storing the image, and displaying the image either automatically or in response to a manual request, i) at the central station, entering a manual request and communicating the request to the monitoring site, causing the control software at the monitoring site to extract image portions corresponding to the marked location of the event from the images of a current image sequence, to compress the image portions, and to transmit the image portions as an image sequence to the central station;

j) when the image portions corresponding to the marked location of the event are received at the central station, the images portions are decompressed, stored, and displayed as a continuous sequence in a fast-motion display mode, and said sequence is inserted into an overall image, or is displayed in a large-scale format, and in the control unit of the monitoring site, the method further comprising:

k) dividing the image into several horizontal image strips before communicating a video image to the image-processing software;

l) averaging sets of several pixels from the image strips below the horizon, but not including the horizon itself, with a number of pixels so averaged increasing between the image strips in a direction toward a bottom edge of the image;

m) inputting the data-reduced images thus obtained to the image-processing software for detecting the smoke and/or the fire; and n) de-distorting the data on the location and the magnitude of the event the image-processing software has returned, wherein the de-distorting steps are an inverse of the dividing and averaging steps (k) and (l)

wherein the de-distorting steps are followed by a step of inserting the data into the original image.

18. The method as in claim 17, the method further comprising: eliminating sources of false alerts including settlements, streets and roads, surfaces of bodies of water, where the smoke or confusing light effects may occur by gg) manually calling up and displaying at the central station images of the observation sectors, or a panoramic image with the marked observation sectors of the monitoring site, hh) causing the control software to outline by a polygon of a suitable shape the portions of an individual image, or of the panoramic image, which may lead, or have previously led, to other false alerts;

ii) causing the control software of the central station to determine parameters of the polygon and to communicate the parameters as exclusion areas to the control software of the monitoring site;

jj) determining manually at the central station whether event messages pertaining to exclusion areas are to be reported to the central station, and causing the control software at the central station to communicate results of the determining step to the control software of the monitoring site;

kk) in case the image processing software issues the event message, the control software of the monitoring site checking whether the message pertains to a least one of the exclusion areas; and ll) in case the event message pertains to the exclusion area, the control software of the monitoring site proceeding, if instructed, reports the event messages to the central station, but without assigning an alert status to the event messages.

19. The method as in claim 17, wherein when the image is transmitted from the monitoring site to the central station, no data reduction takes place in a horizontal direction.

20. A method of monitoring territories and detecting forest and surface fires with a monitoring system including:

a first complex of means stationed at a minimum of one monitoring site, said complex comprising: a camera mounted at an elevated location with the ability to tilt and swivel, the horizontal swivel range being at least 360°, control and evaluation means connected to the camera and running image-processing software for detecting smoke and/or the fire in images from the camera, and having control software, memory for storing events and the images, and an interface to communication means;

a second complex of means installed at a manned central station and comprising a computer including an operating, display and monitoring workplace, control software, memory for the events and the images, means for mixing and outputting the images to at least one monitor, and at least two interfaces to the communication means; the communication means including:

first bidirectional communication means for image files, data, and voice to interconnect said first and second complexes; and second bidirectional data and voice communication means to connect said second complex with deployed firefighting crews, the method comprising:

a) dividing an observation area of the monitoring site into observation sectors each corresponding to a horizontal aperture angle of a lens of the camera;

b) selecting a horizontal angular distance between adjacent observation sectors to create an overlap between them;

c) aiming the camera by positioning means at said observation sectors in automatic succession, or in any order under manual control from the central station;

d) after aiming the camera, providing a plurality of the images timed for adaptation to dynamics of the smoke and the fire;

e) sending the images to a control unit of the monitoring site for storage as an image sequence;

f) processing the images in the control unit of the monitoring site with the image-processing software for detecting the smoke and/or the fire, the image-processing software responding to a presence of the smoke and/or the fire by issuing an event message and data relating to a location and magnitude of the event;

g) if the event message is generated, using the control software of the monitoring site to mark the location of the event in a pertinent one of the images based on the data concerning the location and the magnitude of the event, and to compress the image and to transmit the image to the central station together with an alert message comprising an identity of the monitoring site, an identity of the observation sector, a direction of and an estimated distance to the location of the event;

h) visibly or audibly reproducing the alert message received at the central station, decompressing and storing the image, and displaying the image either automatically or in response to a manual request;

i) at the central station, entering a manual request and communicating the request to the monitoring site, causing the control software at the monitoring site to extract image portions corresponding to the marked location of the event from the images of a current image sequence, to compress the image portions, and to transmit the image portions as an image sequence to the central station;

j) when the image portions corresponding to the marked location of the event are received at the central station, the images portions are decompressed, stored, and displayed as a continuous sequence in a fast-motion display mode, and said sequence is inserted into an overall image, or is displayed in a large-scale format, wherein when the image is transmitted from the monitoring site to the central station, no data reduction takes place in a horizontal direction.

* * * * *